United States Patent [19]

Mase et al.

[11] Patent Number: 4,541,898

[45] Date of Patent: Sep. 17, 1985

[54] METHOD FOR HEATING

[75] Inventors: Syunzo Mase, Aichi; Shigeo Soejima, Nagoya, both of Japan

[73] Assignee: NGK Insulators, Ltd., Japan

[21] Appl. No.: 380,281

[22] Filed: May 20, 1982

[30] Foreign Application Priority Data

May 25, 1981 [JP] Japan .................................. 56-77920

[51] Int. Cl.[4] ........................ G01N 27/46; H05B 3/10

[52] U.S. Cl. .................................... 204/1 T; 204/424; 204/425; 204/426; 204/427; 219/200; 219/482; 219/505; 219/553; 338/7; 338/9; 338/22 R; 338/22 SD

[58] Field of Search ............... 219/505, 553, 200, 482; 204/412, 1 S, 421–429; 338/7, 9, 22 R, 22 SD, 330

[56] References Cited

U.S. PATENT DOCUMENTS 3,585,390 6/1971 Ishikawa .............................. 219/553
3,654,112 4/1972 Beekmans et al. .................... 204/1 S
3,792,233 2/1974 Anthony et al. ..................... 219/553
3,794,950 2/1974 Kilner ................................. 219/505
3,924,098 12/1975 Dunn ................................... 219/553
4,101,454 7/1978 Kulwicki et al. .................... 219/553
4,145,272 3/1979 Nakamura ........................... 204/412
4,223,208 9/1980 Kleinschmidt et al. .......... 338/22 R
4,265,724 5/1981 Haecker .............................. 204/429
4,292,505 9/1981 Lee ...................................... 219/553
4,293,838 10/1981 Wahlers et al. ..................... 219/553
4,407,704 10/1983 Mase et al. .......................... 204/425

*Primary Examiner*—T. Tung
*Attorney, Agent, or Firm*—Parkhurst & Oliff

[57] ABSTRACT

A heating element comprises a resistor comprising a plurality of fine particles or thin films having a negative temperature coefficient of electrical resistance, and highly resistant region layers interposed between the fine particles or thin films, at least two separate electrodes arranged in contact with different particles or layers of the resistor, and means for applying across said electrodes an AC electric voltage, said means operable at AC frequencies which are not lower than a frequency whose complex impedance characteristics which when graphed in the manner shown in FIG. 4 hereof correspond to point B of said graphed complex impedance characteristics. This heating element has the following merits that it can be formed into an optional shape, is low in the power consumption, can be rapidly heated, has temperature self-adjusting performance and temperature detecting performance and is excellent in the durability.

5 Claims, 13 Drawing Figures

METHOD FOR HEATING

BACKGROUND OF THE INVENTION (1) Field of the Invention:

The present invention relates to a heating element having a long durable life and a temperature adjusting performance.

(2) Description of the Prior Art:

There have been known Ni-Cr wire, thermistor, silicon carbide heating elements and the like as a heating element which generates heat by the Joule's heat due to the flowing of electric current.

However, metal wires, such as Ni-Cr wire and the like, generally have low volume resistivity, and it is ordinarily necessary that the metal wires are used in the form of a thin wire in order to obtain a given resistance value, and metal wires have the drawbacks of burn out, short circuit and the like, while, the thermistor has generally a negative temperature coefficient of electric resistance, and therefore when more than a certain value of electric power is applied to a thermistor, electric current is locally concentrated to cause local heating of the thermistor, and when the electric current is excessively large, the thermistor breaks. Therefore, only a bead-shaped thermistor may practically be used, and only very small electric power can be applied to the thermistor.

A heating element using ceramics, such as silicon carbide or the like, is apt to be oxidized at the joint portion of the heating element with the metal terminal due to high temperature. Therefore, only rod-shaped ceramic heating elements having long terminals arranged at both ends of their heat-generating portion have hitherto been used as a ceramic heating element. Accordingly, ceramic heating elements have the drawbacks that a large amount of energy is lost due to the liberation of heat, and the heating element itself is apt to break.

SUMMARY OF THE INVENTION

It is an object of the present invention to provide a heating element, which is substantially free from the above described drawbacks of breakage of wire, breakage of the heating element itself and the like in conventional heating elements, and to which can be applied a large amount of electric power, which can be formed into an optional shape, and which has a temperature self-adjusting performance.

The feature of the present invention is to provide a heating element, comprising:

- a resistor comprising a plurality of fine particles or thin films having a negative temperature coefficient of electrical resistance, and highly resistant region layers interposed between the fine particles or thin films;
- at least two separate electrodes arranged in contact with different particles or layers of the resistor; and
- means for applying across said electrodes an AC electric voltage, said means operable at AC frequencies which are not lower than a frequency whose complex impedance characteristics, when graphed in the manner shown in FIG. 4 hereof, correspond to point B of said graphed complex impedance characteristics.

Another object of the present invention is to provide a method of heating an element comprising an electric resistor, which comprises a plurality of fine particles or thin films having a negative temperature coefficient of electric resistance, and highly resistant region layers interposed between said fine particles or thin films, and at least two separate electrodes arranged in contact with different particles or layers of the resistor, comprising the steps of:

- applying an AC current across at least two of said separate electrodes with a frequency such that the element is operated only at an AC frequency which is not lower than a frequency whose complex impedance characteristic, when graphed in the manner shown in FIG. 4 hereof, corresponds to point B of said graphed complex impedance characteristics, thereby heating the element.

A further object of the present invention is to provide the method wherein an AC current and an AC voltage between the electrodes have a negative relation, in which when one increases, the other decreases.

A still further object of the present invention is to provide the method wherein the AC current has a frequency at which an impedance of electrostatic capacitance $C_2$ at the highly resistant region layers interposed between the fine particles or thin films is smaller than a resistance $R_2$ at the highly resistant region layers.

Another object of the present invention is to provide the method wherein a temperature is detected by the impedance during the flowing of the AC current.

In the present invention, the resistor is a solid electrolyte.

DESCRIPTION OF THE PREFERRED EMBODIMENT

Figure 1:
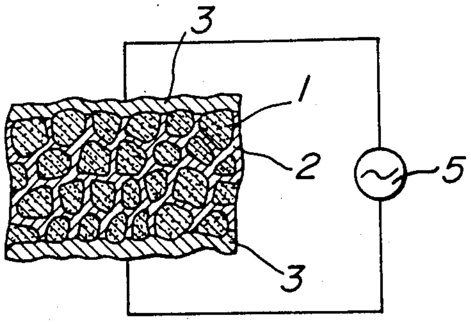
FIG. 1 is a diagrammatical sectional view of an essential part of one embodiment of the heating element according to the present invention.

FIG. 1 illustrates diagrammatically one embodiment of the heating element according to the present invention. Referring to FIG. 1, electrodes 3 consisting of gold, platinum or the like are arranged at both ends of a resistor consisting of fine particles 1 having a negative temperature coefficient of electric resistance and highly resistant region layers 2 interposed between the fine particles. As the resistor, use is made of resistors produced by bonding fine particles of semiconductors with each other by highly resistant glass, silicon oxide or the like. The semiconductors include ceramics, such as zirconia ceramics, β-alumina ceramics, aluminum nitride, titania ceramics, zinc oxide, tin oxide, barium titanate and the like; metallic silicon and the like. In this case, fine particles of $ZrO_2$, β-$Al_2O_3$, AlN, $TiO_2$, ZnO, $SnO_2$, $BaTiO_3$, Si and the like correspond to fine particle 1, and crystal grain boundary, glass, silicon oxide and the like correspond to highly resistant region layer 2. In addition to the structure of a resistor shown in FIG. 1, a structure shown in FIG. 2, wherein highly resistant region layers 2 are arranged between thin films 4 which have a negative temperature coefficient of electric resistance and are formed of the same material as that of the above described fine particles 1 by sputtering, CVD, printing and other methods, is also included in the resistor of the present invention.

In the present invention, when it is intended to heat a heating element including such resistor, it is important to apply an AC current having a frequency, at which a polarization of AC current component is caused mainly due to a polarization of the resistor itself, between electrodes arranged on the resistor.

Figure 2:
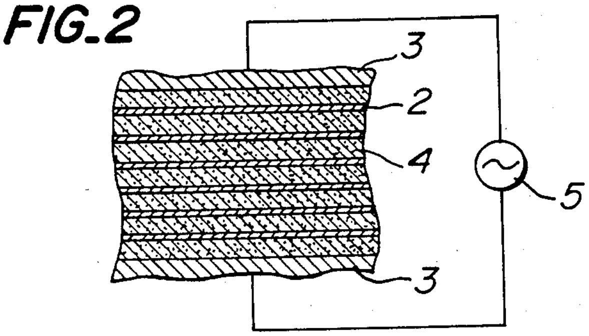
FIG. 2 is a diagrammatical sectional view of an essential part of another embodiment of the heating element according to the present invention.
Figure 3:
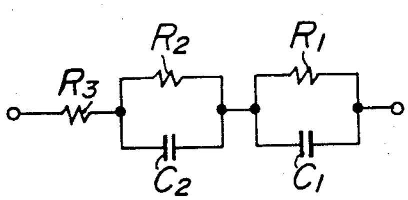
FIG. 3 is an equivalent circuit for the heating element according to the present invention.

That is, FIG. 3 illustrates an electrically equivalent circuit for a heating element formed by arranging electrodes on a resistor illustrated in FIG. 1 or 2 which consists of a plurality of fine particles or thin films having a negative temperature coefficient of electric resistance and highly resistant region layers interposed between the fine particles or thin films. In FIG. 3, $R_1$ is a polarization resistance at the interface between the resistor and the electrode, $C_1$ is an electrostatic capacitance due to the polarization at the interface between the resistor and the electrode, $R_2$ is a resistance of the highly resistant region layer interposed between the fine particles or the thin films, $C_2$ is an electrostatic capacitance of the highly resistant region layer; and $R_3$ is the resistance of the fine particles or thin films. The frequency characteristic of the impedance of the heating element illustrated by the equivalent circuit is shown by two connected circular arcs in FIG. 4, which indicates it in a complex impedance $Z=Z'-jZ''$. The resistance value at point A in FIG. 4 corresponds to the value of $R_1+R_2+R_3$ in FIG. 3, the resistance value at point B in FIG. 4 corresponds to the value of $R_2+R_3$ in FIG. 3 and the resistance value at point C in FIG. 4 corresponds to the value of $R_3$ in FIG. 3. The polarization of the heating element from point A to point B is mainly due to $R_1$ and $C_1$, and that of the heating element from point B to point C is mainly due to $R_2$, $R_3$ and $C_2$. A relation between the above described point in FIG. 4 and the frequency at the point is as follows. Point A corresponds to direct current. The frequency becomes higher towards point B from point A along the arc, and much higher towards point C from point B along another arc. The arc extending from point A to point B varies in a large amount depending upon the surface state of the resistor, the adhered state of the electrode to the resistor and the use of the heating element for a long period of time. Accordingly, it is difficult that an electric power necessary for heating a heating element is stably applied to the element within this frequency range.

Figure 4:
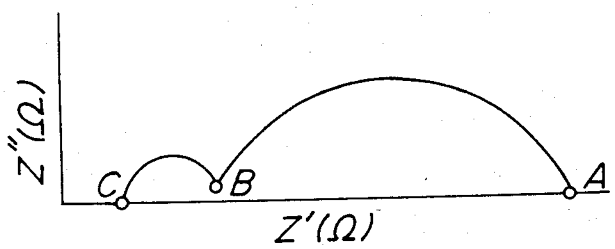
FIG. 4 is a graph illustrating the complex impedance characteristic of the heating element.

When a heat resistant electrode made of platinum or the like is used as the electrode or a solid electrolyte is used as the resistor in order to use the heating element of the present invention at high temperature, the arc extending from point A to point B in FIG. 4 generally becomes very large at low temperature, and a high voltage is applied to the interface between the electrode and the resistor to cause peeling of electrode, deterioration of the resistor surface and further to cause unfavorable discharge, induction trouble and the like due to the high voltage.

However, the heating element according to the present invention is heated by an AC current having a frequency at which a polarization of AC current component is caused mainly due to a polarization of the resistor itself, that is, a frequency within the range of from point B to point C, and therefore even when the AC current has a large value enough to heat the resistor, the peeling of electrode and the deterioration and breakage and other troubles of the resistor do not occur. The reason is as follows. When an AC current having a frequency higher than that at point B is applied to the resistor, the major part of the polarization is caused in the resistor itself, which corresponds to $R_2$, $C_2$ and $R_3$. However, the polarization is substantially uniformly dispersed in the thickness direction of the resistor in its interior, and as a result the deterioration of the resistor due to the flowing of electric power hardly occurs. While, the polarization hardly occurs at the interface between the electrode and the resistor, which interface corresponds to $R_1$ and $C_1$ where the deterioration of resistor occurs generally and therefore the resistor does not deteriorate at the interface between the electrode and the resistor, and the resistor does not break even in a rapid heating.

FIG. 4 illustrates a graph showing the complex impedance characteristic of the heating element. It can be seen from FIG. 4 that the impedance of a heating element within the range of from point B to point C is dependent upon a characteristic of the resistor itself, and therefore the heating element is not substantially influenced by the surface state of resistor, the adhered state of electrode to resistor, the kind of electrode and the variation of resistor due to the use for a long period of time. When an alternating voltage having a frequency not lower than the point B is applied to a heating element, a resistance value is lower than the direct current resistance value, and therefore a solid electrolyte can be stably heated by a relatively low voltage. Even when a resistor is heated by an AC current having a frequency within a certain range, which are not lower than a frequency of point B shown in FIG. 4, the local heating of the resistor can be prevented, and therefore it is desirable to heat the resistor by an AC current having a frequency at which the impedance $C_2$ in FIG. 3 is lower than $R_2$. Thus the AC power supplying means is arranged to supply an AC voltage at a frequency sufficiently high that the impedance between the electrodes to which AC voltage is applied is largely independent of the interface capacitances between the electrodes to which AC voltage is applied and the surface of the resistor.

Figure 5:
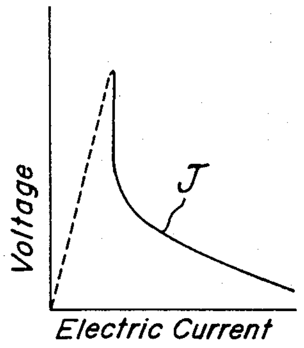
FIG. 5 is a graph illustrating a voltage-current characteristic of a heating element when an alternating current is applied to it.
Figure 8:
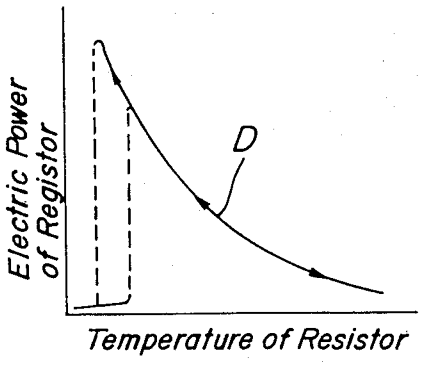
FIG. 8 is a graph illustrating a relation between the temperature of a resistor and the electric power applied thereto.

FIG. 5 illustrates a relation between an electric current and voltage when an AC voltage having a frequency within the range of from point B to point C is applied between the electrodes arranged on a resistor. It can be seen from FIG. 5 that there is a negative relation between the current and voltage, that is, one increases, the other decreases, in a zone where the current is more than a determined value (curve J). This phenomenon is caused by the fact that, when an AC current is applied to a resistor to heat it, the resistor itself exhibits a temperature adjusting performance as explained later with FIG. 8. Accordingly, when a resistor is heated, it is preferable to apply an AC current within the zone of the curve J to the resistor, because the AC voltage to be applied becomes lower depending upon the self-heating temperature owing to the above described negative relation.

Figure 6:
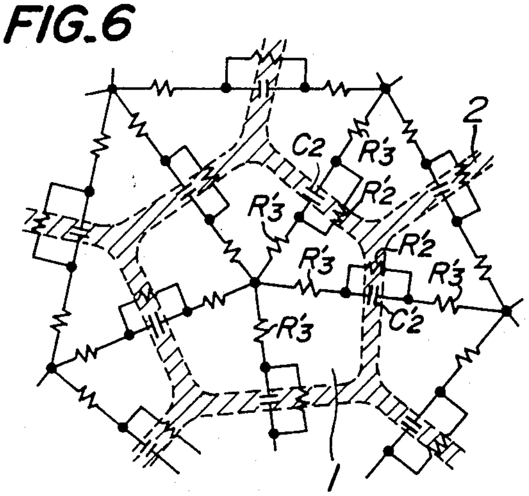
FIG. 6 is a diagrammatical view illustrating a relation between the microstructure of a heating element and the equivalent circuit thereof.

Moreover, in the present invention, $R_2$, $C_2$ and $R_3$ formed in the interior of the resistor do not consist of single resistance $R_2$, capacitance $C_2$ and resistance $R_3$, but consist of a plurality of resistances $R'_2$, capacitances $C'_2$ and resistances $R'_3$ distributed all over the interior of the resistor consisting of fine particles 1 having a negative temperature coefficient of electric resistance and highly resistant region layers 2 as illustrated diagrammatically in FIG. 6 in an enlarged scale. Therefore, for example, even when the temperature of a resistor for individual resistance $R'_3$ is raised by a certain reason to lower its resistance value and to be made into a state wherein an electric current flows easily, the electric current i' does not exceed a value calculated from a formula $i'=2\pi\cdot C'_2\cdot f\cdot v'$, that is, a value determined by $C'_2$ connected to the above described specific $R'_3$, the voltage v' to be applied, and the frequency f. Accordingly, the voltage v' to be applied to one portion of the highly resistant region layer and the $C'_2$ at the portion are very low, and the concentration of local electric current can be prevented. Moreover, the resistor of the present invention is free from the local heating, which occurs always in a conventional thermistor consisting mainly of iron oxide and having a negative temperature coefficient of electric resistance. Therefore, even when electrodes are arranged on a flat plate-shaped resistor, the resistor can be wholly heated up to a uniform temperature.

Figure 7:
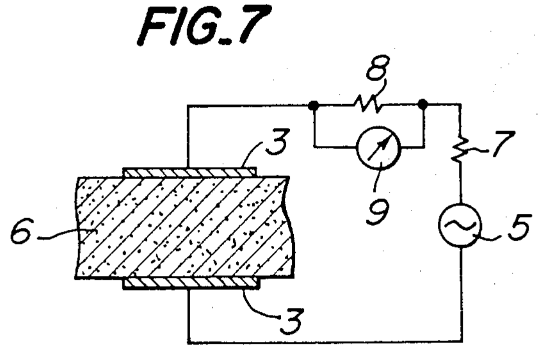
FIG. 7 is a diagrammatical view of one embodiment of a circuit for detecting the impedance in the present invention.

When an AC current power source 5 for heating is connected to a resistor 6 having a negative temperature coefficient of electric resistance through an electric current controlling resistor 7 as illustrated in FIG. 7, the electric current controlling resistor 7 acts to prevent the flowing of an excessively large amount of current through the resistor 6 and to suppress the electric power to be applied to the resistor 6 to a low value at a high temperature, to which the resistor 6 needs not to be heated. Furthermore, it can be understood from the relation between the temperature of a resistor 6 and the electric power applied thereto illustrated in FIG. 8 that the resistor itself has a temperature adjusting performance when rthe resistor is used within its negative characteristic range as illustrated by the curve D in FIG. 8. The above described electric current controlling resistor 7 may be a capacitor or an inductor.

The electrode to be used in the present invention may be made of any conductors durable to a given temperature, and includes metals, such as nickel, silver, gold, platinum, rhodium, palladium, nickel and the like; zinc oxide, $LaCoO_3$ and the like. The electrode can be adhered to the resistor by any of conventional methods used in the adhesion of electrode to ceramic material and the like, that is, by vapor deposition under vacuum, spattering, electroless plating, thermal decomposition or reduction of metal salt solution, baking of metal powder paste, cermet, flame spraying and the like. Further, in order to prevent the vaporization and contamination of the electrode during the use, the electrode can be protected by a refractory layer or by embedding the electrode in the resistor.

The temperature of the heating element of the present invention can be found out by measuring its impedance.

Figure 9:
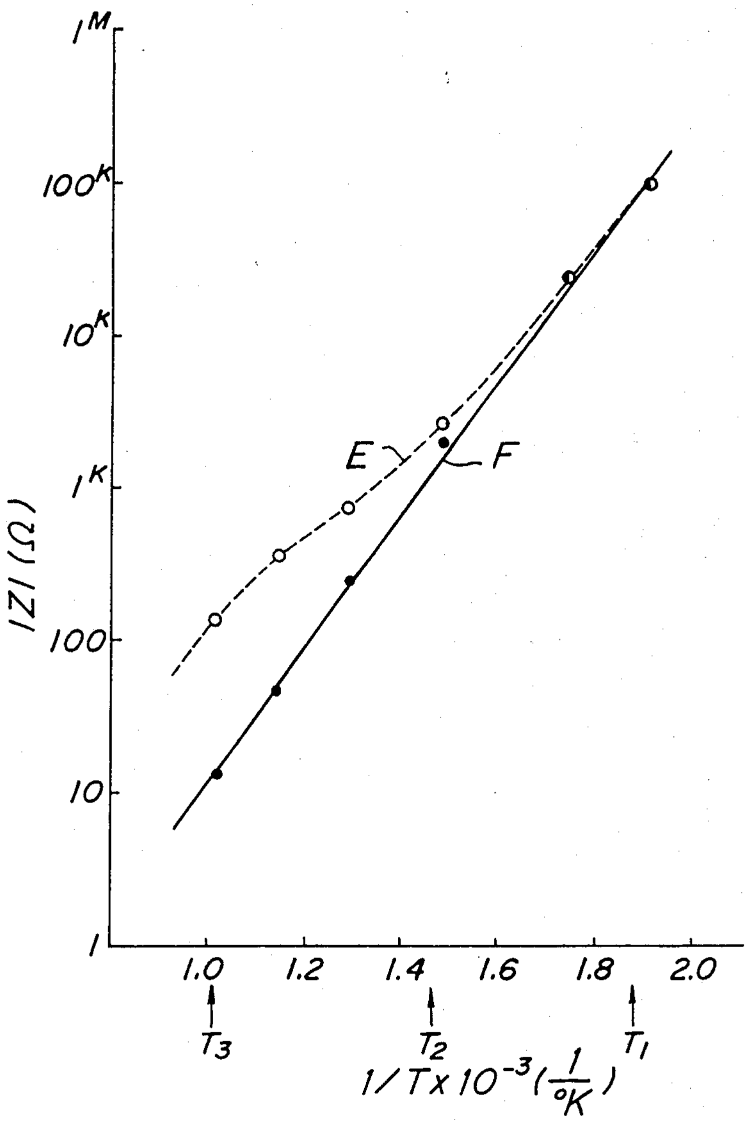
FIG. 9 is a graph illustrating a relation between the impedance and the temperature of a heating element.

The complex impedance expression of the heating element is formed of two connected arcs as illustrated in FIG. 4. This impedance of the heating element varies depending upon its temperature, and gives lower values at points A, B and C shown in FIG. 4 corresponding to the increase of temperature, and gives higher frequencies at the vicinity of points B and C. FIG. 9 illustrates a relation between the temperature and impedance of a resistor when an alternating current having a certain constant frequency is applied to the resistor. When the impedance of a resistor is measured, the temperature thereof can be found out. In FIG. 9, the curve E is an impedance measured at a temperature of $T_2$ by an AC current having a frequency shown by point B and curve F is an impedance measured at a temperature of $T_3$ by an AC current having a frequency shown by point C in FIG. 4. In the present invention, the frequency used for the measurement of impedance is a frequency at which a polarization of AC current component is caused mainly due to a polarization of the resistor itself, that is, a frequency within the range of from point B to point C. The reason is that, when the temperature rise from $T_2$ to $T_3$ in the case of curve E in FIG. 9, the impedance varies from point B to point A along the arc in FIG. 4, within which range the impedance is highly influenced by the state of the interface between the resistor and the resistor, the adhered state of the electrode to the resistor and the like, and the heating element is very unstable for the use for a long period of time.

Figure 10:
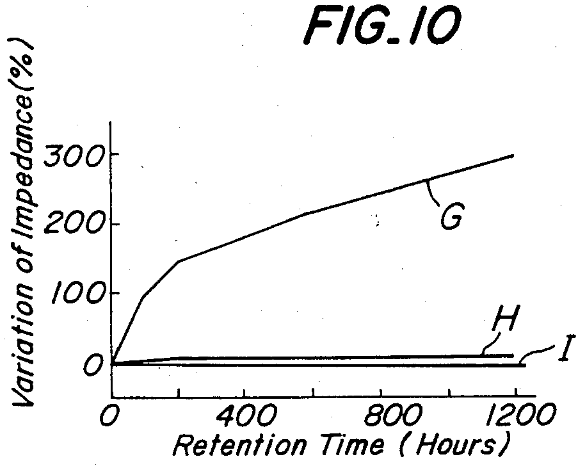
FIG. 10 is a graph illustrating a relation between the retention time of high temperature and the variation of impedance of a heating element.

That is, FIG. 10 illustrates the variation of impedance of a heating element kept at 400° C. when the heating element is retained in air kept at 1,000° C. Curve G is an impedance measured by a direct current at point A, and curves H and I are impedances measured by an alternating current having frequencies at the vicinities of points B and C, respectively.

Moreover, within the frequency range corresponding to the range between points B and C, wherein a polarization of alternating current component is caused mainly due to a polarization of the resistor itself, the impedance does not vary unless the fine particles or thin films and highly resistant region layers vary. Accordingly, the variation of impedance due to the lapse of time is very small as illustrated by curves H and I in FIG. 10, but curve G is very large in the variation of impedance and is unstable.

The detection of impedance may be always or continuously effected, or may be effected alternately with the heating. Further, the detection may be effected in the following manner. As illustrated in FIG. 7, a voltage generated in an electric current detecting element 8 used for detecting the impedance is fed back to an AC power source 5 for heating, whereby the voltage or frequency of the AC power source 5 is controlled to adjust the electric power to be applied to the resistor and to keep constant the temperature of the resistor; or an impedance is detected by the terminal voltage of the heating element or an electric current controlling resistor 7, and the same feedback as described above is carried out. The frequency of an AC power source for detecting the impedance may be same with or different from that of an AC power source for heating. Furthermore, the electrode used for detecting the impedance may be same with that used for heating as shown in FIG. 7, or may be different from that for heating. The heating element of the present invention may be used in the form of a plate, cylinder, cylinder having a closed bottom, thin film and the like. However, when a self-heating portion in a resistor is smaller in the thickness than other portion thereof or is heat insulated, an electric current can be flowed through the portion, and the portion can be stably heated to a temperature higher than that of any other portions.

Moreover, in the heating element according to the present invention, the temperature of the resistor can be measured by detecting the impedance, and therefore even when heat is locally generated, the temperature of the heat-generating portion can be measured in a high accuracy. Further, the resistor to be heated has a negative temperature coefficient of electric resistance, and therefore it is sometimes impossible to flow through the resistor a satisfactorily large amount of electric current for heating it. In this case, a supplementary heater is embedded in the resistor or is placed at the vicinity of the resistor, and the resistor is preliminarily heated until a sufficiently large amount of electric current flows through the resistor.

The following examples are given for the purpose of illustration of this invention and are not intended as limitations thereof.

EXAMPLE 1

Figure 11:
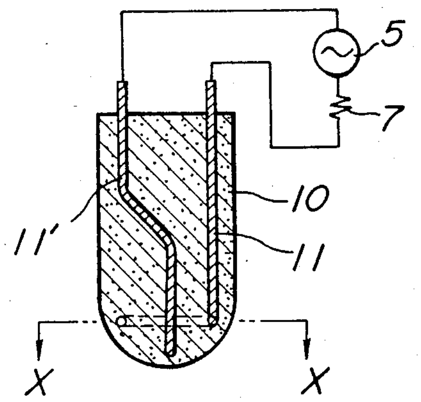
FIG. 11 is a diagrammatical sectional view of a heating element described in Example 1 of the present invention.
Figure 12:
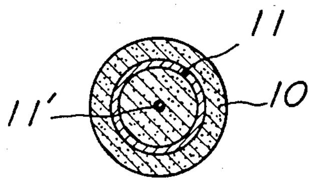
FIG. 12 is a cross-sectional view of the heating element taken on a line X—X in FIG. 11.

A resistor 10 having a diameter of 3 mm was made of a titania ceramic comprising a plurality of fine particles consisting of 96% by weight of $TiO_2$, 1% by weight of $Nb_2O_3$ and 3% by weight of clay, and highly resistant region layers interposed between the fine particles; and a pair of platinum wire electrodes 11 and 11' were embedded in the resistor to produce a heating element as illustrated in FIGS. 11 and 12. The frequencies and Z'-values of the heating element at points A, B and C in its complex impedance at room temperature are shown in Table 1. When an AC current of 1 MHz and 100 mA was aplied to the heating element, the temperature of the lower end portion of the heating element rose to 500° C. after 10 seconds. The above described frequencies and Z'-values in the above treated heating element are also shown in Table 1. In the above described heating, the temperature of the lower end portion rose to 530° C. after one minute, and the temperature did not change thereafter.

EXAMPLE 2

A cylindrical resistor having a closed bottom, which had a negative temperature coefficient of electric resistance and had an outer diameter of 2 mm and an inner diameter of 1 mm, was made of ceramics consisting of 94% by weight of ZnO, 3% by weight of $Sb_2O_3$, 2.5% by weight of $Bi_2O_3$ and 0.5% by weight of $Al_2O_3$. A gold paste to be formed into electrodes after baking was applied to the resistor up to a height of 3 mm from the bottom in its inner and outer surfaces, and baked to the resistor to produce a heating element. The frequencies and Z'-values of the heating element at points A, B and C in its complex impedance at room temperature are shown in Table 1. Further, an alternating current of 100 KHz and 100 mA was applied to the heating element for 5 seconds to raise the temperature to 300° C. The frequencies and Z'-values at points A, B and C in its complex impedance at 300° C. are also shown in Table 1.

EXAMPLE 3

A disc-shaped resistor having a negative temperature coefficient of electric resistance and having a diameter of 5 mm and a thickness of 1 mm was made of a zirconia ceramic consisting of 100 parts by weight of a mixture of 97 mol% of $ZrO_2$ and 3 mol% of $Y_2O_3$ and 2 parts by weight of alumina. Platinum electrodes were arranged on both sides of the disc-shaped resistor by means of a sputtering to produce a heating element. Spinel was flame sprayed on the surface of the electrode to form a protecting layer having a thickness of 0.1 mm. The resulting heating element was preliminarily heated in a furnace kept at 400° C., and then an alternating current of 10 KHz and 200 mA was applied to the heating element. The temperature of the heating element was found to be 750° C. from the impedance. The frequencies and Z'-values of the heatinfg element at points A, B and C in its complex impedance at 400° C. and 750° C. are shown in Table 1.

TABLE 1

| | | Point A | | Point B | | Point C | |
|---|---|---|---|---|---|---|---|
| Example | Temperature (°C.) | Frequency (Hz) | Z' (Ω) | Frequency (Hz) | Z' (Ω) | Frequency (Hz) | Z' (Ω) |
| 1 | room temperature | DC | $1 \times 10^6$ | 10 | $1 \times 10^5$ | 10K | $6 \times 10^4$ |
| | 500 | DC | $1 \times 10^3$ | 1K | $5 \times 10^2$ | 10M | $2 \times 10^2$ |
| 2 | room temperature | DC | more than $10^9$ | less than 0.1 | more than $10^8$ | 1K | $2 \times 10^{\circ}$ |
| | 300 | DC | $1.5 \times 10^4$ | 20 | $1.0 \times 10^4$ | 1M | $1 \times 10^{-1}$ |
| 3 | 400 | DC | $1.0 \times 10^6$ | 100 | $1.0 \times 10^5$ | 100K | $1.0 \times 10^4$ |
| | 750 | DC | $2.5 \times 10^1$ | 10K | $1.5 \times 10^2$ | more than 10M | $4 \times 10^1$ |

EXAMPL 4

Figure 13:
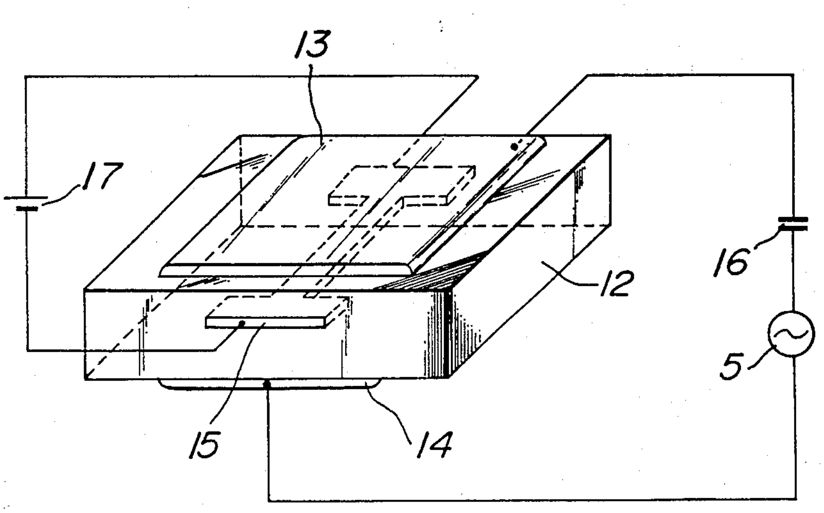
FIG. 13 is a diagrammatical sectional view of a heating element described in Example 4 of the present invention.

A flat plate-shaped solid electrolyte resistor 12 was made of a zirconia ceramic consisting of 100 parts by weight of a mixture of 95 mol% of $ZrO_2$ and 5 mol% of $Y_2O_3$ and 3 parts by weight of clay. As illustrated in FIG. 13, platinum electrodes 13 and 14 were arranged on both surfaces of the resistor 12, and the electrodes were coated with porous spinel layer respectively (not shown in the figure), and further an auxiliary heater 15 consisting of tungsten was embedded in the interior of the resistor 12. Between the electrodes 13 and 14 were connected an AC current power source 5, an electric current limiting capacitor 16. The resistor 12 was exposed to air at room temperature. Another power source 17 was connected to the auxiliary heater 15 used as a second heating means, and an electric power was applied to the auxiliary heater 15 to preheat the solid electrolyte to about 350° C. Then, a AC current of 0.5 A used as a first heating means and having a frequency of 10 KHz, at which a polarization of AC current component is caused mainly due to a polarization of the solid electrolyte, was applied to the resistor to cause self-heating therein. Then, the heating by the auxiliary heater 15 used as a second heating means was stopped. As a result, the solid electrolyte continued its self-heating by a power consumption of 3 W, and was stably maintained at 700° C.

As described above, the heating element of the present invention has the following various merits that the element can be formed into an optional shape and can be locally heated, resulting in a low power consumption; that the element is very seldom in the breakage of wire and in the breakage of the heating element itself; that the element can be rapidly heated; that the element has temperature self-adjusting performance and temperature detecting performance; that the element is excellent in the durability; and the like. Therefore, the heating element can be used, for example, as a glow plug of diesel engine, an igniter of burner, a heater for heating various gas sensors, and other purposes; and is vary valuable in industry.

What is claimed is:

1. A method of heating an element comprising an electric resistor which comprises a plurality of thin films having a negative temperature coefficient of electric resistance and highly resistant region layers interposed between said thin films and at least two separate electrodes arranged in contact with different layers of the resistor, such that the plurality of thin films is located between said at least two separate electrodes, comprising the steps of:

applying an AC current across at least two of said separate electrodes with a frequency which is sufficiently high that an impedance between said electrodes to which AC voltage is applied is largely independent of interface capacitances between said electrodes to which AC voltage is applied and a surface where said electrodes contact said resistor, thereby heating the element.

2. The method of claim 1 wherein an AC current and an AC voltage between the electrodes have a negative relation, in which when one increases, the other decreases.

3. The method of claim 1 or 2 wherein the AC current has a frequency at which an impedance of electrostatic capacitance at the highly resistant region layers interposed between the thin films is smaller than a resistance at the highly resistant region layers.

4. The method of claim 1 or 2 wherein the resistor is a solid electrolyte.

5. The method of claim 1 or 2 wherein a temperature is detected by the impedance during the flowing of the AC current.

* * * * *